US012747336B2

(12) United States Patent
Kawaguchi et al.

(10) Patent No.: US 12,747,336 B2
(45) Date of Patent: Sep. 29, 2026

(54) POLYMERIZABLE COMPOSITION FOR OPTICAL MATERIAL, OPTICAL MATERIAL, AND USE THEREOF

(71) Applicant: MITSUI CHEMICALS, INC., Tokyo (JP)

(72) Inventors: Masaru Kawaguchi, Mizuma-gun (JP); Shinsuke Ito, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 587 days.

(21) Appl. No.: 17/428,313

(22) PCT Filed: Feb. 7, 2020

(86) PCT No.: PCT/JP2020/004779

§ 371 (c)(1),
(2) Date: Aug. 4, 2021

(87) PCT Pub. No.: WO2020/162592

PCT Pub. Date: Aug. 13, 2020

(65) Prior Publication Data

US 2022/0289945 A1 Sep. 15, 2022

(30) Foreign Application Priority Data

Feb. 8, 2019 (JP) ................................ 2019-021646
Mar. 20, 2019 (JP) ................................ 2019-052771

(51) Int. Cl.
*C08K 5/3475* (2006.01)
*C08G 18/38* (2006.01)
(Continued)

(52) U.S. Cl.
CPC ........ *C08K 5/3475* (2013.01); *C08G 18/3876* (2013.01); *C08G 18/765* (2013.01); *C08K 5/45* (2013.01); *G02B 1/041* (2013.01)

(58) Field of Classification Search
CPC ...... C08K 5/45; C08K 5/3475; C08G 18/765; C08G 18/3876; G02B 1/041; G02C 7/10; C08L 75/04
See application file for complete search history.

(56) References Cited

U.S. PATENT DOCUMENTS 6,187,844 B1 2/2001 Murata
2015/0370094 A1* 12/2015 Hashimoto ............ G02B 5/208 252/589

(Continued)

FOREIGN PATENT DOCUMENTS

CN 103676201 A 3/2014
CN 108084385 A * 5/2018 ......... C08G 18/2885

(Continued)

OTHER PUBLICATIONS

Knels et al., "Blue light stress in retinal neuronal (R28) cells is dependent on wavelength range and irradiance" The European Journal of Neuroscience, vol. 34, Iss.4, 548-558, (2011).

*Primary Examiner* — Bijan Ahvazi
(74) *Attorney, Agent, or Firm* — BUCHANAN INGERSOLL & ROONEY PC

(57) ABSTRACT

A polymerizable composition for an optical material of the present disclosure includes (A) an isocyanate compound, (B) at least one active hydrogen compound selected from the group consisting of a polythiol compound having two or more mercapto groups, a hydroxythiol compound having one or more mercapto groups and one or more hydroxyl groups, a polyol compound having two or more hydroxyl groups, and an amine compound, and (C) an ultraviolet absorber represented by General Formula (1).

(Continued)

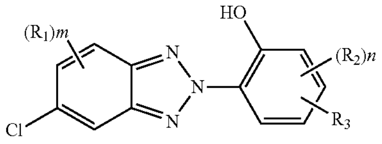

(1)

7 Claims, 2 Drawing Sheets

(51) Int. Cl.

| | |
|---|---|
| ***C08G 18/76*** | (2006.01) |
| ***C08K 5/45*** | (2006.01) |
| ***G02B 1/04*** | (2006.01) |

(56) References Cited

U.S. PATENT DOCUMENTS

| | | | |
|---|---|---|---|
| 2016/0215121 A1 | 7/2016 | Kousaka et al. | |
| 2018/0016415 A1* | 1/2018 | Kakinuma ........... | C08G 18/792 |

FOREIGN PATENT DOCUMENTS

| | | | |
|---|---|---|---|
| JP | H04219703 | A | 8/1992 |
| JP | H10186291 | A | 7/1998 |
| JP | H11218602 | A | 8/1999 |
| JP | H11295502 | A | 10/1999 |
| JP | 2005292240 | A | 10/2005 |
| JP | 2008020756 | A | 1/2008 |
| JP | 2012-173704 | A | 9/2012 |
| WO | 2014133111 | A1 | 9/2014 |
| WO | 2015/046540 | A1 | 4/2015 |
| WO | 2015088011 | A1 | 6/2015 |
| WO | 2016125736 | A1 | 8/2016 |

* cited by examiner

POLYMERIZABLE COMPOSITION FOR OPTICAL MATERIAL, OPTICAL MATERIAL, AND USE THEREOF

TECHNICAL FIELD

The present disclosure relates to a polymerizable composition for an optical material, an optical material, and a use thereof.

BACKGROUND ART

In the related art, the adverse effects of exposure of the eyes to ultraviolet light have been regarded as a problem. Furthermore, in recent years, there has been a problem in that blue light included in natural light, light emitted from liquid crystal displays of office equipment and displays of portable equipment such as smartphones and mobile phones, and the like affects the eyes, causing eye fatigue, pain, and the like and it is desirable to reduce the amount of exposure of the eyes to relatively short wavelength blue light of approximately 420 nm from ultraviolet light.

The influence of short wavelength blue light of approximately 420 nm on the eyes is described in Non-Patent Document 1. In Non-Patent Document 1, retinal nerve cells (cultured retinal nerve R28 cells from rats) were irradiated with blue LED light having different peak wavelengths of 411 nm and 470 nm and damage to the retinal nerve cells was verified. As a result, it was shown that, when irradiated (4.5 $W/m^2$) with blue light having a peak wavelength at 411 nm, cell death of the retinal nerve cells occurred within 24 hours, while blue light having a peak wavelength at 470 nm did not cause changes in the cells even with the same amount of irradiation, thereby showing that suppressing exposure to light with a wavelength of 400 to 420 nm is important to prevent eye damage.

In addition, there is a concern that irradiation of the eyes to blue light for a long time causes eye fatigue and stress and may be considered a factor which causes age-related macular degeneration.

Examples of techniques aimed at suppressing the transmission of blue light are as follows.

Patent Document 1 discloses a plastic lens including an ultraviolet absorber having an average light transmittance of 0.5% or less in a wavelength region of 300 nm to 400 nm.

Patent Document 2 discloses a plastic lens obtained from a composition for a plastic lens containing a resin material including a urethane resin material and at least two types of ultraviolet absorbers having different maximum absorption wavelengths.

Patent Document 3 discloses a plastic lens obtained from a composition for a plastic lens containing a resin material including a urethane resin material and an ultraviolet absorber having a maximum absorption wavelength of 345 nm or more in a chloroform solution. The above document describes that, according to this plastic lens, there is no yellowing of the lens and no change in the refractive index, or the like due to the effect of the ultraviolet absorber, and that the mechanical strength of the lens is not reduced.

Patent Document 4 discloses a plastic spectacle lens using a specific benzotriazole compound. This document describes that this plastic spectacle lens has a light transmittance in a predetermined range at a wavelength of 395 nm, a wavelength of 400 nm, and a wavelength of 405 nm.

Patent Documents 5 and 6 disclose polymerizable compositions for optical materials including an isocyanate compound, an active hydrogen compound, and a predetermined ultraviolet absorber.

In addition, Patent Document 7 discloses a polymerizable composition for an optical material including a compound including an episulfide group or a compound including a thietanyl group and a predetermined benzotriazole-based compound as an ultraviolet absorber, and a plastic lens obtained from this composition. The above document describes that, according to the plastic lens, there is an excellent effect of blocking blue light of approximately 420 nm. The above document does not disclose a benzotriazole-based compound provided with a group including an ester bond.

RELATED DOCUMENT

Patent Document

[Patent Document 1] Japanese Unexamined Patent Publication No. H10-186291

[Patent Document 2] Japanese Unexamined Patent Publication No. H11-218602

[Patent Document 3] Japanese Unexamined Patent Publication No. H11-295502

[Patent Document 4] Japanese Unexamined Patent Publication No. 2005-292240

[Patent Document 5] Japanese Unexamined Patent Publication No. H4-219703

[Patent Document 6] International Publication No. WO2016/125736

[Patent Document 7] International Publication No. WO2015/088011

Non-Patent Document

[Non-Patent Document 1] The European journal of neuroscience, Vol. 34, Iss. 4, 548-58, 2011

SUMMARY OF THE INVENTION

Technical Problem

In order to increase the ultraviolet absorption amount (also called the cut rate), it is necessary to increase the amount of ultraviolet absorber added to the optical material. However, when the amount of ultraviolet absorber is increased, there is a tendency for the optical material to become cloudy and transparency to decrease or for the color to deteriorate due to coloring. In this manner, there was a trade-off relationship between the effect of blocking blue light of approximately 420 nm from ultraviolet light and the design properties of the optical material (transparency, suppression of coloring, and the like).

The present disclosure improves the trade-off relationship and provides a polymerizable composition for an optical material, an optical material, and a use thereof, which are able to achieve both a high cut rate and design properties.

Solution to Problem

It is possible to illustrate the present disclosure as follows.

[1] A polymerizable composition for an optical material, the composition including (A) an isocyanate compound, (B) at least one active hydrogen compound selected from the group consisting of a polythiol compound having two or more mercapto groups, a hydroxythiol compound having one or more mercapto groups and one or more hydroxyl groups, a polyol compound having two or more hydroxyl groups, and an amine compound, and (C) an ultraviolet absorber represented by General Formula (1), (1)

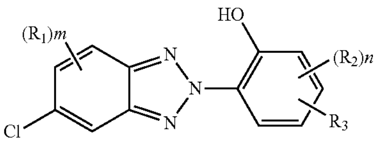

wherein, in General Formula (1), $R_1$ and $R_2$ represent an alkyl group having 1 to 8 carbon atoms, and may be the same or different, a plurality of $R_1$'s or a plurality of $R_2$'s may be the same or different, m represents an integer of 0 to 3, n represents an integer of 0 to 3, and $R_3$ represents a functional group having 4 to 10 carbon atoms and including an ester bond.

[2] A polymerizable composition for an optical material, the composition including (D) a compound having a cyclic structure including a sulfur atom, and (C) an ultraviolet absorber represented by General Formula (1), (1)

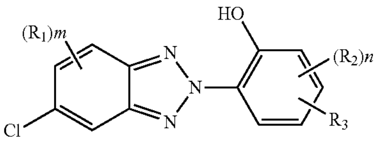

wherein, in General Formula (1), $R_1$ and $R_2$ represent an alkyl group having 1 to 8 carbon atoms, and may be the same or different, a plurality of $R_1$'s or a plurality of $R_2$'s may be the same or different, m represents an integer of 0 to 3, n represents an integer of 0 to 3, and $R_3$ represents a functional group having 4 to 10 carbon atoms and including an ester bond.

[3] The polymerizable composition for an optical material according to [1] or [2], in which the ultraviolet absorber (C) is represented by General Formula (2), (2)

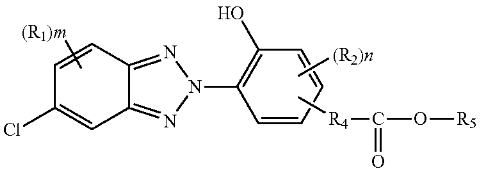

wherein, in General Formula (2), $R_1$, $R_2$, m, and n are the same as in General Formula (1), $R_4$ represents a hydrocarbon group having 1 to 3 carbon atoms, and $R_5$ represents a hydrocarbon group having 1 to 7 carbon atoms.

[4] The polymerizable composition for an optical material according to [2], in which the ultraviolet absorber (C) is represented by General Formula (3), (3)

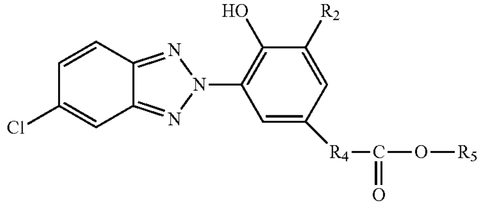

wherein, in General Formula (3), $R_2$, $R_4$, and $R_5$ are the same as in General Formula (1) or (2).

[5] The polymerizable composition for an optical material according to any one of [1] to [3], in which a maximum absorption peak of the ultraviolet absorber (C) is in a range of 340 nm 370 nm.

[6] The polymerizable composition for an optical material according to [1], in which the isocyanate compound (A) includes at least one selected from an aromatic isocyanate compound and an aromatic aliphatic isocyanate compound.

[7] The polymerizable composition for an optical material according to [6], in which the isocyanate compound (A) is at least one selected from the group consisting of xylene diisocyanate, phenylene diisocyanate, tolylene diisocyanate, and diphenylmethane diisocyanate.

[8] The polymerizable composition for an optical material according to [2], in which the compound (D) has two or more three- to five-membered cyclic structures including a sulfur atom in one molecule and a weight average molecular weight of 100 to 1000.

[9] The polymerizable composition for an optical material according to [8], in which the compound (D) includes an episulfide group represented by General Formula (5), (5)

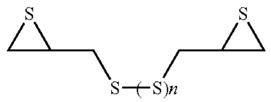

wherein, in the formula, n represents 0 or 1.

[10] The polymerizable composition for an optical material according to [1], in which the polythiol compound (B) is at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate).

[11] The polymerizable composition for an optical material according to [1], in which the ultraviolet absorber (C) is included in an amount of 0.1 to 10.0 parts by mass in 100 parts by mass of the polymerizable composition for an optical material.

[12] The polymerizable composition for an optical material according to [11], in which the ultraviolet absorber (C) is included in an amount of 0.1 to 2.0 parts by mass in 100 parts by mass of the polymerizable composition for an optical material.

[13] The polymerizable composition for an optical material according to [2], in which the ultraviolet absorber (C) is included in an amount of 0.1 to 3.0% by weight in 100% by weight of a total weight of the compound (D) having a cyclic structure including a sulfur atom and the polythiol (B) included as necessary.

[14] A cured product of the polymerizable composition for an optical material according to [1].

[15] A cured product of the polymerizable composition for an optical material according to [2], including 0.1 to 3.0% by weight of the ultraviolet absorber (C).

[16] A plastic lens including the cured product according to [14] or [15].

Advantageous Effects of Invention

According to the polymerizable composition for an optical material of the present disclosure, using a specific ultraviolet absorber makes it possible to provide an optical material having an excellent effect of blocking blue light of approximately 420 nm from ultraviolet light and excellent design properties.

BRIEF DESCRIPTION OF THE DRAWINGS

The object described above, as well as other objects, characteristics, and advantages, will be further clarified by the suitable embodiments and the accompanying drawings below.

DESCRIPTION OF EMBODIMENTS

Figure 1:
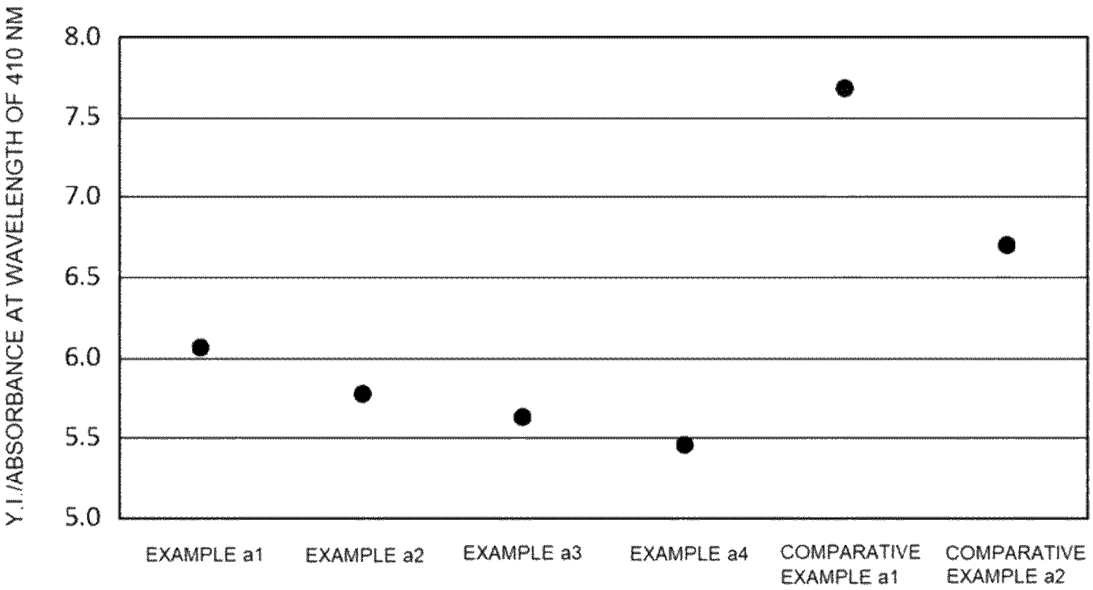
FIG. 1 is a graph which plots Y.I./absorbance at wavelength of 410 nm, calculated in Examples a1 to a4 and Comparative Examples a1 and a2.

A detailed description will be given below of embodiments of the present disclosure; however, the present disclosure is not limited to such embodiments. In the present disclosure, a numerical range indicated using "to" indicates the range including the numerical values described before and after "to" as the minimum value and maximum value, respectively.

The polymerizable composition for an optical material of the present disclosure includes a polymerization reactive compound and an ultraviolet absorber represented by General Formula (1).

As the polymerization reactive compound, it is possible to use any known compound as long as it is possible to obtain the effect of the present invention and examples thereof include isocyanate compounds, isothiocyanate compounds, active hydrogen compounds (polythiol compounds, hydroxythiol compounds, polyol compounds, amine compounds, and the like), epoxy compounds, compounds having a cyclic structure including a sulfur atom, oxetanine compounds, (meth)acrylic compounds, (meth)allyl compounds, and the like, and it is possible to use one type or two or more types of compound selected from the above.

Preferable examples of the polymerizable compositions for optical materials and cured products thereof of the present disclosure are described through the first embodiment and second embodiment.

First Embodiment

The polymerizable composition for an optical material of the present disclosure includes (A) an isocyanate compound, (B) at least one active hydrogen compound selected from the group consisting of a polythiol compound having two or more mercapto groups, a hydroxythiol compound having one or more mercapto groups and one or more hydroxyl groups, a polyol compound having two or more hydroxyl groups, and an amine compound, and (C) an ultraviolet absorber represented by General Formula (1).

(1)

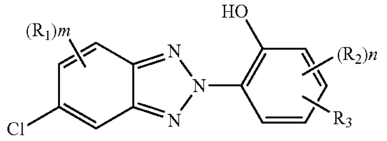

In General Formula (1), $R_1$ and $R_2$ represent an alkyl group having 1 to 8 carbon atoms, and may be the same or different. A plurality of $R_1$'s or a plurality of $R_2$'s may be the same or different. m represents an integer of 0 to 3, n represents an integer of 0 to 3, and $R_3$ represents a functional group having 4 to 10 carbon atoms and including an ester bond.

A detailed description will be given below of each component.

[(A) Isocyanate Compound]

In the present disclosure, it is possible to use various isocyanate compounds as the isocyanate compound (A) without being particularly limited, as long as it is possible to exhibit the effects of the present disclosure. In the present disclosure, it is preferable to use an isocyanate compound having two or more isocyanato groups.

Examples of the isocyanate compound (A) include aliphatic isocyanate compounds, alicyclic isocyanate compounds, aromatic isocyanate compounds, heterocyclic isocyanate compounds, aromatic aliphatic isocyanate compounds, and the like, which are able to be used as one type or a mixture of two or more types. These isocyanate compounds may include dimers, trimers, and prepolymers.

Examples of aliphatic isocyanate compounds include hexamethylene diisocyanate, 2,2,4-trimethylhexamethylene diisocyanate, 2,4,4-trimethylhexamethylene diisocyanate, pentamethylene diisocyanate, lysine diisocyanatomethyl ester, lysine triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis (isocyanatoethylthio)ethane, bis(isocyanatomethylthio) ethane, and the like, and it is possible to use at least one.

Examples of alicyclic isocyanate compounds include isophorone diisocyanate, bis(isocyanatomethyl)cyclohexane, bis(isocyanatocyclohexyl)methane, cyclohexane diisocyanate, methylcyclohexane diisocyanate, dicyclohexyl dimethyl methane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, and the like and it is possible to use at least one.

Examples of aromatic isocyanate compounds include tolylene diisocyanate, 4,4'-diphenylmethane diisocyanate, phenylene diisocyanate, and the like, in which tolylene diisocyanate is one or more types of isocyanates selected from 2,4-tolylene diisocyanate and 2,6-tolylene diisocyanate. Examples of tolylene diisocyanate include 2,4-tolylene diisocyanate, 2,6-tolylene diisocyanate, a mixture of 2,4-tolylene diisocyanate and 2,6-tolylene diisocyanate, or the like, and it is possible to use at least one.

Examples of heterocyclic isocyanate compounds include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl) tetrahydrothiophene, 2,5-diisocyanato-1,4-dithiane, 2,5-bis (isocyanatomethyl)-1,4-dithiane, 4,5-diisocyanato-1,3-dithiolane, 4,5-bis(isocyanatomethyl)-1,3-dithiolane, and the like, and it is possible to use at least one.

Examples of aromatic aliphatic isocyanate compounds include xylylene diisocyanate (1,3- or 1,4-xylylene diisocyanate or mixtures thereof) (XDI), tetramethylxylylene diisocyanate (1,3- or 1,4-tetramethylxylylene diisocyanate or mixtures thereof) (TMXDI), ω,ω'-diisocyanate-1,4-diethylbenzene, α,α,α',α'-tetramethylxylylene diisocyanate, bis (isocyanatomethyl)naphthalene, mesitylene triisocyanate, and the like, and it is possible to use at least one.

In the present disclosure, from the viewpoint of the effect of the present disclosure, the isocyanate compound (A) preferably includes at least one selected from aliphatic isocyanate compounds, aromatic isocyanate compounds, and aromatic aliphatic isocyanate compounds, more preferably includes at least one selected from aromatic isocyanate compounds and aromatic aliphatic isocyanate compounds, and even more preferably includes at least one selected from xylene diisocyanate, phenylene diisocyanate, tolylene diisocyanate, and diphenylmethane diisocyanate.

From the viewpoint of the effect of the present disclosure, the content of the isocyanate compound (A) in the polymerizable composition for an optical material is preferably 30 parts by mass or more in 100 parts by mass of the polymerizable composition for an optical material, more preferably 40 parts by mass or more, and preferably 70 parts by mass or less, more preferably 60 parts by mass or less.

[(B) Active Hydrogen Compound]

In the present disclosure, as the active hydrogen compound (B), it is possible to use at least one selected from a polythiol compound having two or more mercapto groups, a hydroxythiol compound having one or more mercapto groups and one or more hydroxyl groups, a polyol compound having two or more hydroxyl groups, and an amine compound. From the viewpoint of the effect of the present disclosure, at least one selected from a polythiol compound having two or more mercapto groups and a hydroxythiol compound having one or more mercapto groups and one or more hydroxyl groups is preferable, and at least one selected from a polythiol compound having two or more mercapto groups is more preferable.

As the polythiol compound, it is possible to select and use compounds known in the related art as long as it is possible to obtain the effect of the present invention, for example, it is possible to use the compounds disclosed in WO2008/105138.

As preferable polythiol compounds, it is possible to use at least one selected from 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis (mercaptomethylthio)propane, 4,6-bis (mercaptomethylthio)-1,3-dithiane, 2-(2,2-bis (mercaptomethylthio)ethyl)-1,3-dithiethane, 1,1,2,2-tetrakis (mercaptomethylthio)ethane, 3-mercaptomethyl-1,5-dimercapto-2,4-dithiapentane, tris(mercaptomethylthio) methane, and ethylene glycol bis(3-mercaptopropionate).

More preferably, it is possible to use at least one selected from 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, and pentaerythritol tetrakis(3-mercaptopropionate).

Examples of hydroxythiol compounds include 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl) methane, 1-hydroxyethylthio-3-mercaptoethylthiobenzene, 4-hydroxy-4'-mercapto diphenyl sulfone, 2-(2-mercaptoethylthio)ethanol, dihydroxyethyl sulfide mono(3-mercaptopropionate), dimercaptoethane mono(saltylate), hydroxyethylthiomethyl-tris(mercaptoethylthio)methane, and the like.

Polyol compounds are one or more types of aliphatic or alicyclic alcohol compounds, specifically, examples thereof include linear or branched-chain aliphatic alcohol compounds, alicyclic alcohol compounds, alcohols to which ethylene oxide, propylene oxide, or ε-caprolactone are added to the above alcohols, and the like.

Examples of linear or branched-chain aliphatic alcohol compounds include ethylene glycol, diethylene glycol, triethylene glycol, propylene glycol, dipropylene glycol, tripropylene glycol, 1,3-propanediol, 2,2-dimethyl-1,3-propanediol, 2,2-diethyl-1,3-propanediol, 1,2-butanediol, 1,3-butanediol, 1,4-butanediol, 3-methyl-1,3-butanediol, 1,2-pentanediol, 1,3-pentanediol, 1,5-pentanediol, 2,4-pentanediol, 2-methyl-2,4-pentanediol, 3-methyl-1,5-pentanediol, 1,6-hexanediol, 2,5-hexanediol, glycerol, diglycerol, polyglycerol, trimethylolpropane, pentaerythritol, di(trimethylolpropane), and the like.

Examples of alicyclic alcohol compounds include 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 4,4'-bicyclohexanol, 1,4-cyclohexanedimethanol, and the like.

Compounds in which ethylene oxide, propylene oxide, or ε-caprolactone is added to the above alcohols may be used. Examples thereof include ethylene oxide adducts of glycerol, ethylene oxide adducts of trimethylolpropane, ethylene oxide adducts of pentaerythritol, propylene oxide adducts of glycerol, propylene oxide adducts of trimethylolpropane, propylene oxide adducts of pentaerythritol, caprolactone-modified glycerol, caprolactone-modified trimethylolpropane, caprolactone-modified pentaerythritol, and the like.

The amine compound may have at least two primary and/or secondary amine groups (polyamines). Non-limiting examples of suitable polyamines include primary or secondary diamines or polyamines, in which case the groups attached to the nitrogen atoms may be saturated or unsaturated, aliphatic, alicyclic, aromatic, aromatic-substituted aliphatic, aliphatic-substituted aromatic, or heterocyclic. Non-limiting examples of suitable aliphatic and alicyclic diamines include 1,2-ethylenediamine, 1,2-propylenediamine, 1,8-octanediamine, isophoronediamine, propane-2, 2-cyclohexylamine, and the like. Non-limiting examples of suitable aromatic diamines include phenylenediamine and toluenediamine, for example, o-phenylenediamine and p-trilenediamine. Polynuclear aromatic diamines, for example, 4,4'-biphenyldiamine, 4,4'-methylenedianiline, and monochloro derivatives and dichloro derivatives of 4,4'-methylenedianiline are also suitable.

As polyamines suitable for use in the present disclosure, it is possible to include substances having General Formula (4) without being limited thereto.

(4)

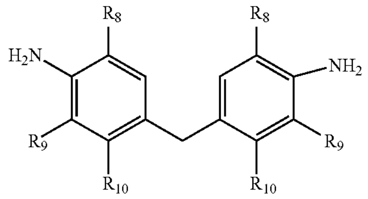

In the formula, $R_8$ and $R_9$ are each independently selected from methyl, ethyl, propyl, and isopropyl groups and it is possible to select $R_{10}$ from hydrogen and chlorine.

Non-limiting examples of polyamines for use in the present disclosure include the below compounds manufactured by Lonza Ltd., (Basel, Switzerland).

LONZACURE (registered trademark) M-DIPA: $R_8=C_3H_7$; $R_9=C_3H_7$; $R_{10}=H$

LONZACURE (registered trademark) MM-DMA: $R_8=CH_3$; $R_9=CH_3$; $R_{10}=H$

LONZACURE (registered trademark) MM-MEA: $R_8=CH_3$; $R_9=C_2H_5$; $R_{10}=H$

LONZACURE (registered trademark) MM-DEA: $R_8=C_2H_5$; $R_9=C_2H_5$; $R_{10}=H$

LONZACURE (registered trademark) MM-MIPA: $R_8=CH_3$; $R_9=C_3H_7$; $R_{10}=H$

LONZACURE (registered trademark) MM-CDEA: $R_8=C_2H_5$; $R_9=C_2H_{15}$; $R_{10}=Cl$ In the above, $R_8$, $R_9$, and $R_{10}$ correspond to the chemical formula described above.

As the polyamine, it is possible to include a diamine-reactive compound, for example, 4,4'-methylenebis(3-chloro-2,6-diethylaniline), commercially available in the United States from Air Products and Chemical, Inc. (Allentown, Pa.), (Lonzacure (registered trademark) M-CDEA), 2,4-diamino-3,5-diethyl-toluene, 2,6-diamino-3,5-diethyl-toluene, and mixtures thereof, commercially available under the trade name Ethacure 100 from Albemarle Corporation (collectively "diethyltoluenediamine" or "DETDA"), dimethylthiotoluenediamine (DMTDA), commercially available from Albemarle Corporation under the trade name Ethacure 300, 4,4'-methylene-bis(2-chloroaniline), commercially available from Kingyorker Chemicals Co., Ltd., as MOCA. DETDA has a viscosity of 156 cPs at 25° C. and is able to be a liquid at room temperature. DETDA may be isomeric, the 2,4-isomer range may be 75 to 81 percent, while the 2,6-isomer range may be 18 to 24 percent. A color-stabilized version of Ethacure 100 (that is, a blended product containing an additive for reducing yellow color), commercially available under the trade name Ethacure 100S, may be used in the present disclosure.

Other possible examples of polyamines include ethylene amines. Suitable ethylene amines include ethylenediamine (EDA), diethylenetriamine (DETA), triethylenetetramine (TETA), tetraethylene pentamine (TEPA), pentaethylene hexamine (PEHA), piperazine, morpholine, substituted morpholine, piperidine, substituted piperidine, diethylenediamine (DEDA), and 2-amino-1-ethylpiperazine, without being limited thereto. In specific embodiments, it is possible to select the polyamine from one or a plurality of isomers of dialkyltoluenediamine having 1 to 3 carbon atoms, for example, 3,5-dimethyl-2,4-toluenediamine, 3,5-dimethyl-2, 6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine, and mixtures thereof, without being limited thereto. Methylenedianiline and trimethylene glycol di(para-aminobenzoic acid) are also suitable.

Additional examples of suitable polyamines include methylenebisaniline, aniline sulfide, and bianiline, any of which may be hetero-substituted, in which case the substituents do not interfere with any reactions occurring between the reactants.

Specific examples include 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline), and 4,4'-methylene-bis(2,6-diethyl-3-chloroaniline).

Diaminotoluene, such as diethyltoluenediamine (DETDA), is also appropriate.

From the viewpoint of the effect of the present disclosure, the content of the active hydrogen compound (B) in the polymerizable composition for an optical material is preferably 30 parts by mass or more in 100 parts by mass of the polymerizable composition for an optical material, more preferably 40 parts by mass or more, and preferably 70 parts by mass or less, more preferably 60 parts by mass or less.

[Ultraviolet Absorber (C)]

The ultraviolet absorber (C) used in the present disclosure is represented by General Formula (1). As the ultraviolet absorber (C) in the present disclosure, it is possible to use one type or two or more types selected from the ultraviolet absorbers represented by General Formula (1).

(1)

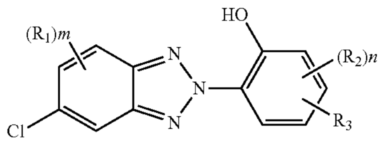

In General Formula (1), $R_1$ and $R_2$ represent an alkyl group having 1 to 8 carbon atoms, preferably an alkyl group having 2 to 6 carbon atoms, and may be the same or different. A plurality of $R_1$'s or a plurality of $R_2$'s may be the same or different.

m represents an integer from 0 to 3, preferably 0 or 1.

n represents an integer from 0 to 3, preferably 1 or 2.

$R_3$ represents a functional group having 4 to 10 carbon atoms and including an ester bond, preferably $—R_4—C(═O)OR_5$ or $—R_4—OC(═O)—R_5$, more preferably $—R_4—C(═O)OR_5$.

$R_4$ represents a divalent hydrocarbon group having 1 to 3 carbon atoms, preferably a divalent hydrocarbon group having 1 or 2 carbon atoms, and more preferably an ethylene group.

$R_5$ represents a hydrocarbon group having 1 to 7 carbon atoms, preferably a hydrocarbon group having 1 to 5 carbon atoms, and more preferably an alkyl group having 1 to 3 carbon atoms.

Using the ultraviolet absorber (C) makes it possible to provide an optical material having an excellent effect of blocking blue light of approximately 420 nm from harmful ultraviolet light and also excellent design properties.

From the viewpoint of the effect of the present disclosure, preferably, it is possible to use one or more types of ultraviolet absorbers selected from the compounds represented by General Formula (2) as the ultraviolet absorber (C).

(2)

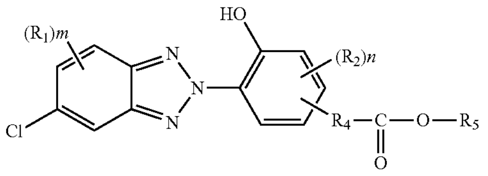

In General Formula (2), $R_1$, $R_2$, m, and n are the same as in General Formula (1).

$R_4$ represents a divalent hydrocarbon group having 1 to 3 carbon atoms, preferably a divalent hydrocarbon group having 1 or 2 carbon atoms, and more preferably an ethylene group.

$R_5$ represents a hydrocarbon group having 1 to 7 carbon atoms, preferably a hydrocarbon group having 1 to 5 carbon atoms, and more preferably an alkyl group having 1 to 3 carbon atoms.

From the viewpoint of the effect of the present disclosure, even more preferably, it is possible to use one type or more of ultraviolet absorber selected from the compounds represented by General Formula (3) as the ultraviolet absorber (C).

(3)

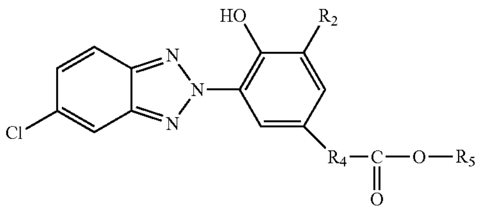

In General Formula (3), $R_2$, $R_4$, and $R_5$ are the same as in General Formula (1) or (2).

The ultraviolet absorber (C) in the present disclosure preferably has a maximum absorption peak in a range of 340 nm to 370 nm when dissolved in a chloroform solution, from the viewpoint of the effect of blocking blue light of approximately 420 nm from harmful ultraviolet light.

It is possible to particularly preferably use the compound represented by the following chemical formula as the ultraviolet absorber (C).

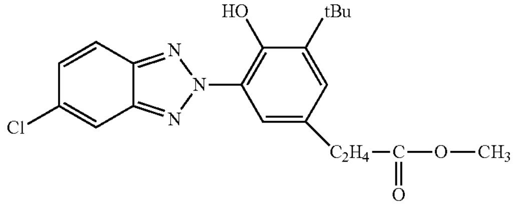

As the ultraviolet absorber (C), it is possible to use Eversorb 88 (manufactured by Everlight Chemical Industrial Corp.) or the like as 3-[3-tert-butyl-5-(5-chloro-2H-benzotriazol-2-yl)-4-hydroxyphenyl]methylpropionate, which is represented by the above chemical formula.

From the viewpoint of the effect of the present disclosure, it is possible for the composition of the present disclosure to include the ultraviolet absorber (C) as 0.1 parts by mass or more in 100 parts by mass of the polymerizable composition for an optical material, preferably 0.5 parts by mass or more, and more preferably 1.0 part by mass or more, and 10.0 parts by mass or less, preferably 5.0 parts by mass or less, and more preferably 2.0 parts by mass or less.

The ultraviolet absorber (C) has excellent solubility and dispersibility with respect to the isocyanate compound (A) and the active hydrogen compound (B), and is able to be easily added by mixing, stirring, and the like with the above.

Since the ultraviolet absorber (C) has excellent solubility and dispersibility with respect to the isocyanate compound (A) and the active hydrogen compound (B), it is possible to obtain a uniform polymerizable composition in a short time with excellent productivity.

Furthermore, since the solubility and dispersibility are excellent, it is possible to add a large amount of the ultraviolet absorber (C), and even when a large amount is added, the ultraviolet absorber (C) does not bleed out from the optical material, thus, clouding or the like does not easily occur. Accordingly, using the ultraviolet absorber (C) makes it possible to easily control the wavelength cut according to the addition amount and to provide an optical material having a high-level effect of blocking blue light of approximately 420 nm from harmful ultraviolet light.

In the present disclosure, from the viewpoint of the effects of the present disclosure, as specific examples of combinations of the isocyanate compound (A), the active hydrogen compound (B), and the ultraviolet absorber (C), the isocyanate compound (A) preferably includes at least one selected from aliphatic isocyanate compounds, alicyclic isocyanate compounds, aromatic isocyanate compounds, and aromatic aliphatic isocyanate compounds, more preferably includes at least one selected from aromatic isocyanate compounds and aromatic aliphatic isocyanate compounds, even more preferably includes at least one selected from xylene diisocyanate, phenylene diisocyanate, tolylene diisocyanate, and diphenylmethane diisocyanate; the active hydrogen compound (B) is preferably at least one selected from the group consisting of polythiol compounds having two or more mercapto groups and hydroxythiol compounds having one or more mercapto groups and one or more hydroxyl groups, more preferably at least one selected from polythiol compounds having two or more mercapto groups, and even more preferably at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate); and the ultraviolet absorber (C) is preferably at least one selected from the compounds represented by General Formula (2) described above, more preferably at least one selected from the compounds represented by General Formula (3) described above, and even more preferably 3-[3-tert-butyl-5-(5-chloro-2H-benzotriazol-2-yl)-4-hydroxyphenyl]methylpropionate.

In the present disclosure, other ultraviolet absorbers may be included in addition to the ultraviolet absorber (C). Examples include benzophenone-based compounds, triazine compounds, benzotriazole-based compounds, and the like.

Examples of benzophenone-based compounds include 2,2'-dihydroxy-4,4'-dimethoxybenzophenone, 2,2'-4,4'-tetrahydroxybenzophenone, and the like.

Triazine compounds include ADK Stab LA-F70 manufactured by Adeka Corp., TINUVIN 400 manufactured by BASF Corp., and the like.

In addition, the other ultraviolet absorbers are preferably ultraviolet absorbers having a structure other than that of General Formula (1) and having a maximum absorption peak in a range of 340 nm to 370 nm.

In the present disclosure, the molar ratio of the active hydrogen group in the active hydrogen compound (B) with respect to the isocyanato group in the isocyanate compound (A) is in a range of 0.8 to 1.2, preferably in a range of 0.85 to 1.15, and even more preferably in a range of 0.9 to 1.1. In the ranges described above, it is possible to obtain a resin suitable for use as an optical material, in particular, as a plastic lens material for glasses.

(Other Components)

The polymerizable composition for an optical material of the present disclosure may further include, as other components, a polymerization catalyst, an internal mold release agent, a resin modifier, a light stabilizer, a bluing agent, and the like.

(Catalyst)

Examples of catalysts include Lewis acids, amines, organic acids, amine organic acid salts, and the like, Lewis acids, amines, and amine organic acid salts are preferable, and dimethyl tin chloride, dibutyl tin chloride, and dibutyl tin laurate are more preferable.

wherein, internal Mold Release Agent)

As an internal mold release agent, it is possible to use acidic phosphate esters. Examples of acidic phosphate esters include phosphoric acid monoesters and phosphoric acid diesters and it is possible to use each alone or in a mixture of two or more types.

For example, it is possible to use ZelecUN manufactured by STEPAN Company, an internal mold release agent for MR manufactured by Mitsui Chemicals, Inc, the JP series manufactured by Johoku Chemical Co., Ltd., the Phosphanol series manufactured by Toho Chemical Industry Co., Ltd., the AP and DP series manufactured by Daihachi Chemical Industry Co., Ltd., and the like.

(Resin Modifier)

In the polymerizable composition for an optical material of the present disclosure, it is possible to add a resin modifier in a range in which the effect of the present disclosure is not impaired, for the purpose of adjusting various physical properties of the obtained resin, such as the optical properties, impact resistance, and specific gravity, and of adjusting the handling property of the polymerizable composition.

Examples of resin modifiers include episulfide compounds, alcohol compounds, amine compounds, epoxy compounds, organic acids and anhydrides thereof, olefin compounds including (meth)acrylate compounds or the like, and the like.

(Light Stabilizers)

As a light stabilizer, it is possible to use a hindered amine-based compound. Commercially available products of hindered amine-based compounds include Lowilite 76 and Lowilite 92 manufactured by Chemtura Corporation, Tinuvin 144, Tinuvin 292, and Tinuvin 765 manufactured by BASF Corp., ADK Stab LA-52 and LA-72 manufactured by Adeka Corp., JF-95 manufactured by Johoku Chemical Co., Ltd., and the like.

(Bluing Agent)

Examples of bluing agents include agents having an absorption band in the orange to yellow wavelength range in the visible light region and having a function of adjusting the hue of optical materials formed of resins. Bluing agents more specifically include substances that exhibit blue to violet colors.

It is possible to obtain the polymerizable composition for an optical material of the present disclosure by mixing the isocyanate compound (A), the active hydrogen compound (B), the ultraviolet absorber (C), and, if necessary, other thiol compounds, catalysts, internal mold release agents, and other additives using a predetermined method.

The temperature at the time of mixing is usually 25° C. or lower. From the viewpoint of the pot life of the polymerizable composition for an optical material, an even lower temperature may be preferable. However, in a case where the catalyst, the internal mold release agent, or the additive does not have good solubility in the isocyanate compound (A) or active hydrogen compound (B), it is also possible to carry out heating and dissolving in advance.

The mixing order and mixing method of each component in the composition are not particularly limited, as long as it is possible to uniformly mix each component, and it is possible to perform the mixing using known methods. As known methods, for example, there are a method for preparing a master batch including a predetermined amount of the additives and dispersing or dissolving this master batch in a solvent, or the like.

<Cured Product>

It is possible to obtain a cured product by polymerizing the polymerizable composition for an optical material of the present disclosure and to obtain cured products of various shapes depending on the shape of the mold. Possible examples of the polymerization method include any method known in the related art and the conditions thereof are also not limited.

In the present disclosure, the manufacturing method of the cured product is not particularly limited, but injection polymerization is an example of a preferable manufacturing method. Initially, the polymerizable composition for an optical material is injected between molding molds held by gaskets, tapes, or the like. At this time, depending on the physical properties required for the cured product to be obtained, it is often preferable to perform a defoaming treatment under reduced pressure, a filtration treatment such as a compression and a decompression, or the like, as necessary.

The polymerization conditions are not limited, since conditions vary depending on the type and usage amount of component (A) to component (C), the type and usage amount of the catalyst, the shape of the mold, and the like, but the polymerization is performed at a temperature of −50° C. to 150° C. for 1 to 50 hours, approximately. In some cases, it is preferable to hold or gradually increase the temperature in a range of 10° C. to 150° C. and carry out the curing in 1 to 25 hours.

The cured product of the present disclosure may be subjected to a treatment such as annealing as necessary. The treatment is usually performed at a temperature of 50° C. to 150° C., but preferably performed at 90° C. to 140° C., and more preferably performed at 100° C. to 130° C.

In addition, in the present disclosure, it is possible to use the cured product obtained by heat curing the polymerizable composition for an optical material as, for example, an optical material and it is possible to form a part of an optical material. The cured product of the present disclosure is colorless, transparent, excellent in external appearance, excellent in an effect of blocking blue light of approximately 420 nm from ultraviolet light, excellent in design properties, excellent in various physical properties such as optical properties, such as high refractive index and high Abbe number, and heat resistance, and it is possible to use the cured product as various optical materials by giving the cured product a desired shape and providing a coating layer and other components formed as necessary.

From the viewpoint of the effect of the present disclosure, it is possible for the ultraviolet absorber (C) included in the cured product of the present disclosure to include 0.1 parts by mass or more in 100 parts by mass of the polymerizable composition for an optical material, preferably 0.5 parts by mass or more, more preferably 1.0 part by mass or more, and to include 10.0 parts by mass or less of the polymerizable composition for an optical material, preferably 5.0 parts by mass or less, and more preferably 2.0 parts by mass or less.

Second Embodiment

The polymerizable composition for an optical material of the present disclosure includes (D) a compound having a cyclic structure including a sulfur atom and (C) an ultraviolet absorber represented by General Formula (1).

A detailed description will be given below of each component.

[(D) Compound Having Cyclic Structure Including Sulfur Atom)]

In the present disclosure, as the compound (D) having a cyclic structure including a sulfur atom, it is possible to use various compounds without any particular limitation as long as the above structure is provided and it is possible to exhibit the effects of the present disclosure.

Examples of the compound (D) include a compound having two or more three- to five-membered cyclic structures including a sulfur atom in one molecule. Examples of three- to five-membered rings including S include an episulfide group, a thietanyl group, a thiolanyl group, and a thienyl group.

It is possible to set the weight average molecular weight of the compound (D), for example, to 100 to 1000, and preferably 150 to 500.

As the compound (D), a compound having two or more episulfide groups or thietanyl groups is preferable. As compounds having two or more episulfide groups (referred to below as episulfide compounds (D1)) and compounds having two or more thietanyl groups (referred to below as thietanyl compounds (D2)), the following specific example compounds may be given as examples.

As episulfide compounds (D1), it is possible to use a compound having two or more episulfide groups in the molecule, as disclosed in WO2009/104385.

Specifically, the episulfide compound (D1) is a compound represented by General Formula (5) and examples thereof include bis(1,2-epithioethyl)sulfide, bis(1,2-epithioethyl) disulfide, 1,3-bis(2,3-epithiopropylthio)cyclohexane, 1,4-bis(2,3-epithiopropylthio)cyclohexane, 1,2-bis(2,3-epithiopropylthio)benzene, 1,3-bis(2,3-epithiopropylthio)benzene, bis(2,3-epithiopropyl)ether, bis(2,3-epithiopropyloxy)methane, 1,3-bis(2,3-epithiopropyloxy)cyclohexane, 1,2-bis(2,3-epithiopropyloxy)benzene, and the like. It is possible to use at least one selected from the above.

(5)

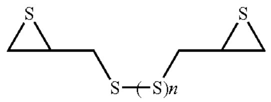

In Formula (5), n represents 0 or 1.

From the viewpoint of the effect of the present invention, the episulfide compound (D1) is preferably bis(1,2-epithioethyl)sulfide, bis(1,2-epithioethyl)disulfide, or a compound represented by General Formula (5), and more preferably a compound represented by General Formula (5). The compounds represented by General Formula (5) are bis(2,3-epithiopropyl)sulfide and bis(2,3-epithiopropyl)disulfide.

The thietanyl compound (D2) is a compound containing a total of two or more thietanyl groups in the molecule, as disclosed in WO2005-95490 and Japanese Unexamined Patent Publication No. 2003-327583.

Specific examples of the thietanyl compound (D2) include polysulfide-based thietane compounds such as the compound represented by General Formula (6), bis(3-thietanylthio)disulfide, bis(3-thietanylthio)methane, 3-(((3'-thietanylthio)methylthio)methylthio)thiethane, bis(3-thietanyl) trisulfide, bis(3-thietanyl)tetrasulfide, bis(3-thietanyl) pentasulfide, and the like. It is possible to use at least one selected from the above.

(6)

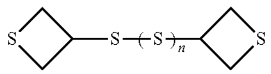

In Formula (6), n represents 0 or 1.

From the viewpoint of the effect of the present invention, the thietanyl compound (D2) is preferably a compound represented by General Formula (6), bisthietanyl trisulfide, bisthietanyl tetrasulfide, or bisthietanyl pentasulfide, and more preferably a compound represented by General Formula (6), specifically, bisthietanyl sulfide or bisthietanyl disulfide.

It is possible to use these episulfide compounds (D1) and thietanyl compounds (D2) alone or in a combination of two or more types. In the present disclosure, as the compound (D), it is particularly preferable to use bis(2,3-epithiopropyl) sulfide and bis(2,3-epithiopropyl)disulfide, which are compounds represented by General Formula (5).

[Ultraviolet Absorber (C)]

For the ultraviolet absorber (C) used in the present disclosure, it is possible to use the same ultraviolet absorber as in the first embodiment.

Since the ultraviolet absorber (C) has excellent solubility and dispersibility with respect to the compound (D) having a cyclic structure including a sulfur atom and the polythiol compound described below, it is possible to obtain a uniform polymerizable composition in a short time with excellent productivity.

Furthermore, since the solubility and dispersibility are excellent, it is possible to add a large amount of the ultraviolet absorber (C), and even when a large amount is added, the ultraviolet absorber (C) does not bleed out from the optical material, thus, clouding or the like does not easily occur. Accordingly, using the ultraviolet absorber (C) makes it possible to easily control the wavelength cut according to the addition amount and to provide an optical material having an excellent effect of blocking blue light of approximately 420 nm from harmful ultraviolet light.

[Polythiol Compounds]

It is possible for the compositions of the present disclosure to further include a polythiol compound having two or more mercapto groups.

For the polythiol compound, it is possible to use the same polythiol compound as in the first embodiment.

Specific examples of the polythiol compound include pentaerythritol tetrakis(2-mercaptoacetate), pentaerythritol tetrakis(3-mercaptopropionate), bis(mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, ethylene glycol bis(3-mercaptopropionate), and the like. It is possible to use at least one selected from the above.

From the viewpoint of the effect of the present disclosure, in the composition of the present disclosure, the ultraviolet absorber (C) is included in an amount of 0.1 to 3.0% by weight with respect to 100% by weight of the compound (D), and preferably 0.5 to 2.0% by weight.

Furthermore, from the viewpoint of the effect of the present disclosure, in a case where the polythiol is included, the ultraviolet absorber (C) is included in an amount of 0.1 to 3.0% by weight with respect to 100% by weight of the total weight of the compound (D) and the polythiol compound, and preferably 0.5 to 2.0% by weight.

In the present disclosure, from the viewpoint of the effects of the present disclosure, specific examples of combinations of the compound (D) having a cyclic structure including a sulfur atom and the ultraviolet absorber (C) include examples in which

- the compound (D) preferably includes at least one selected from the episulfide compound (D1) of General Formula (5) and the thietanyl compound (D2) of General Formula (6), more preferably includes at least one selected from the episulfide compound (D1) of General Formula (5), and even more preferably includes bis(2,3-epithiopropyl)sulfide and/or bis(2,3-epithiopropyl) disulfide; and
- the ultraviolet absorber (C) preferably includes at least one selected from the compounds represented by General Formula (2) described above, more preferably includes at least one selected from the compounds represented by General Formula (3) described above, and even more preferably is 3-[3-tert-butyl-5-(5-chloro-2H-benzotriazol-2-yl)-4-hydroxyphenyl]methylpropionate.

In a case where the composition of the present disclosure further includes a polythiol compound, the polythiol compound preferably includes at least one selected from aliphatic polythiol compounds, aromatic polythiol compounds, and heterocyclic polythiol compounds, and, more preferably, it is possible to include at least one selected from the group consisting of pentaerythritol tetrakis(2-mercaptoacetate), pentaerythritol tetrakis(3-mercaptopropionate), bis(mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, and ethylene glycol bis(3-mercaptopropionate).

In the present disclosure, other ultraviolet absorbers may be included in addition to the ultraviolet absorber (C). Examples include benzophenone-based compounds, triazine compounds, benzotriazole-based compounds, and the like.

Examples of benzophenone-based compounds include 2,2'-dihydroxy-4,4'-dimethoxybenzophenone, 2,2'-4,4'-tetrahydroxybenzophenone, and the like.

Examples of triazine compounds include ADK Stab LA-F70 manufactured by Adeka Corp., TINUVIN 400 manufactured by BASF Corp., and the like. In addition, other ultraviolet absorbers are preferably ultraviolet absorbers having a structure other than that of General Formula (1) and having a maximum absorption peak in a range of 340 nm to 370 nm.

(Other Components)

The polymerizable composition for an optical material of the present disclosure may further include, as other components, a polymerization catalyst, an internal mold release agent, a resin modifier, a light stabilizer, a bluing agent, and the like as described in the first embodiment.

It is possible to obtain a polymerizable composition for an optical material by mixing the compound (D) having a cyclic structure including a sulfur atom, the ultraviolet absorber (C), and a polythiol compound if necessary, and, furthermore, catalysts, internal mold release agents, and other additives using a predetermined method if necessary.

The temperature at the time of mixing is usually 25° C. or lower. From the viewpoint of the pot life of the polymerizable composition for an optical material, an even lower temperature may be preferable. However, in a case where the catalyst, internal mold release agent, and additives do not have good solubility in compound (D), it is also possible to carry out heating and dissolving in advance.

The mixing order and mixing method of each component in the composition are not particularly limited, as long as it is possible to uniformly mix each component, and it is possible to perform the mixing using known methods. As known methods, for example, there are a method for preparing a master batch including a predetermined amount of the additives and dispersing or dissolving this master batch in a solvent.

<Cured Product>

With the polymerizable composition for an optical material of the present disclosure, it is possible to obtain a cured product by the method described in the first embodiment and it is possible to obtain molded objects with various shapes depending on the shape of the mold.

The polymerization conditions are not limited, since conditions vary depending on the type and usage amount of polythiol compounds added to component (D) and component (C) as necessary, the type and usage amount of the catalyst, the shape of the mold, and the like, but the polymerization is performed at a temperature of −50° C. to 150° C. for 1 to 50 hours, approximately. In some cases, it is preferable to hold or gradually increase the temperature in a range of 10° C. to 150° C. and carry out the curing in 1 to 25 hours.

The cured product of the present disclosure may be subjected to a treatment such as annealing in the same manner as in the first embodiment as necessary.

In addition, in the present disclosure, it is possible to use the cured product obtained by heat curing the polymerizable composition for an optical material, for example, as an optical material and it is possible to form a part of an optical material. The cured product of the present disclosure is colorless, transparent, excellent in external appearance, excellent in an effect of blocking blue light of approximately 420 nm from ultraviolet light, excellent in design properties, excellent in various physical properties such as optical properties, such as high refractive index and high Abbe number, and heat resistance, and it is possible to use the cured product as various optical materials by giving the cured product a desired shape and providing a coating layer and other components formed as necessary.

From the viewpoint of the effects of the present disclosure, the ultraviolet absorber (C) is included in an amount of 0.1 to 3.0% by weight in 100% by weight of the cured product, and preferably 0.5 to 2.0% by weight.

<Optical Materials>

Examples of the optical materials of the present disclosure include plastic lenses, camera lenses, light emitting diodes (LEDs), prisms, optical fibers, information recording substrates, filters, light emitting diodes, and the like. In particular, the optical materials of the present disclosure are suitable as optical materials and optical elements such as plastic lenses, camera lenses, light emitting diodes, and the like.

The plastic lens including the cured product of the present disclosure may be used with a coating layer applied to one surface or both surfaces of the lens base material formed of the cured product, if necessary. Examples of coating layers include a primer layer, a hard coat layer, an anti-reflection film layer, an anti-fogging coating film layer, an anti-fouling layer, a water-repellent layer, and the like. It is also possible to use each of these coating layers alone or as a plurality of coating layers in a multi-layered manner. In a case where coating layers are applied to both surfaces, similar coating layers or different coating layers may be applied to each surface.

Each of these coating layers may be combined with infrared absorbers for the purpose of protecting the eyes from infrared rays, light stabilizers and antioxidants for the purpose of improving the weather resistance of the lens, dyes and pigments for the purpose of improving the fashionability of the lens, photochromic dyes and photochromic pigments, antistatic agents, and other known additives to improve the performance of the lens. A coating layer such as a hard coat or anti-reflection coat or a primer layer may be provided.

Plastic lenses including the cured product of the present disclosure may be used after being dyed using dyes according to the purpose, for the purpose of adding fashionability and photochromic properties or the like. It is possible to carry out the dyeing of the lenses using known dyeing methods.

In addition, the method for manufacturing the optical material of the present disclosure includes, for example, a step of carrying out injection polymerization with the polymerizable composition for an optical material of the present disclosure.

Although the present disclosure was described above based on the present disclosure, it is possible to adopt various configurations in a range in which the effects of the present disclosure are not impaired.

EXAMPLES

A more detailed description will be given below of the present disclosure by means of Examples, but the present disclosure is not limited thereto. The present disclosure is explained by Example a and Example b below.

Example a

The evaluation method in Example a is as follows.

<Evaluation Method>

Dissolution Completion Time of Ultraviolet Absorber

In Example a, the time for the complete dissolution in various additives, including ultraviolet absorbers, after the addition of isocyanate solution was visually confirmed.

Light Transmittance

The UV-visible light spectrum was measured using a Shimadzu Spectrophotometer UV-1800 manufactured by Shimadzu Corporation as the measurement instrument using a plano lens with a thickness of 2 mm and the transmittance at a specific wavelength (410 nm) was measured.

Absorbance

In the light transmittance measurement, in a case where the transmittance at 410 nm and 800 nm was set as T % [410 nm] and T % [800 nm], the calculation was carried out using the formula below.

$$\text{Absorbance at 410 nm} = -[\log(T\%[410\text{ nm}]/100) - \log(T\%[800\text{ nm}]/100)]$$

For resins with no anti-reflection function, the transmittance decreases by approximately 10% due to reflection or the like even at the wavelength of 800 nm where there is no absorption. In order to exclude the influence of reflection and the like, the absorbance at 800 nm was subtracted from the absorbance calculated from the transmittance at a wavelength of 410 nm to obtain the absorbance.

Y.I. (Yellow Index)

A circular flat plastic lens with a thickness of 9 mm and Φ75 mm was created and the chromaticity coordinates x and y were measured using a CM-5 color spectrophotometer manufactured by MINOLTA Co., Ltd. Based on the x and y values of the measured results, the Y.I. was calculated using Formula (1).

$$Y.I. = (234*x + 106*y + 106)/y \qquad (1)$$

<Maximum Absorption Peak of Ultraviolet Absorber>

The maximum absorption peaks of the ultraviolet absorbers used in Example a were as follows.

Measurement method: UV-visible light spectra were measured using a Shimadzu Spectrophotometer UV-1800 manufactured by Shimadzu Corporation as the measurement instrument, using a plano lens with a thickness of 2 mm.

Eversorb 88: A maximum absorption peak was present in a range of 340 nm to 370 nm.

TINUVIN 326: A maximum absorption peak was present in a range of 340 nm to 370 nm.

Example a1

0.1 parts by weight of ZelecUN (manufactured by STEPAN Company), 1.5 parts by weight of 3-[3-tert-butyl-5-(5-chloro-2H-benzotriazol-2-yl)-4-hydroxyphenyl]methylpropionate (Eversorb 88 manufactured by Everlight Chemical Industrial Corp.), and 52.0 parts by weight of xylylene diisocyanate were stirred and mixed at 20° C. to obtain a uniform solution. To this uniform solution, 48.0 parts by weight of 4-mercaptomethyl-1,8-dimercapto-3,6-dithiaoctane and 0.15 parts by weight of dibutyltin (II) dichloride were added and the result was stirred and mixed at 20° C. to obtain a mixed solution. The mixed solution was defoamed at 600 Pa for 1 hour, filtered through a 1 μm PTFE filter, and then injected into a mold formed of a 2C (curve, same below) plano glass mold with a center thickness of 2 mm and a diameter of 80 mm and a flat glass mold with a center thickness of 2 mm and a diameter of 78 mm. The mold was placed in a polymerization oven and the temperature was gradually increased from 20° C. to 130° C. for 21 hours to carry out polymerization. After polymerization was completed, the mold was removed from the oven. The obtained plano lenses were subjected to a further annealing process at 130° C. for 2 hours. The obtained plano lens with a thickness of 2 mm was transparent and suitable as a transparent resin for optical materials. The UV-visible light spectrum of the obtained plano lenses was measured using a Spectrophotometer UV-1800 (manufactured by Shimadzu Corporation). The evaluation results are shown in Table-1.

Example a2

Plano lenses with a thickness of 2 mm were obtained by the same method as in Example a1 except that 1.5 parts by weight of 3-[3-tert-butyl-5-(5-chloro-2H-benzotriazol-2-yl)-4-hydroxyphenyl]methylpropionate (Eversorb 88 manufactured by Everlight Chemical Industrial Corp.) was changed to 2.0 parts by weight. The obtained plano lens was transparent and suitable as a transparent resin for optical materials. The UV-visible light spectrum of the obtained plano lenses was measured using a Spectrophotometer UV-1800 (manufactured by Shimadzu Corporation). The evaluation results are shown in Table-1.

Example a3

0.1 parts by weight of ZelecUN (manufactured by STEPAN Company), 1.5 parts by weight of 3-[3-tert-butyl-5-(5-chloro 2H-benzotriazol-2-yl)-4-hydroxyphenyl]methylpropionate (Eversorb 88 manufactured by Everlight Chemical Industrial Corp.), and 50.6 parts by weight of xylylene diisocyanate were stirred and mixed at 20° C. to obtain a uniform solution. To this uniform solution, 49.4 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and 0.10 parts by weight of dibutyltin (II) dichloride were added and the result was stirred and mixed at 20° C. to obtain a mixed solution. The mixed solution was defoamed at 600 Pa for 1 hour, filtered through a 1 μm PTFE filter, and then injected into a mold formed of a 2C (curve, same below) plano glass mold with a center thickness of 2 mm and a diameter of 80 mm and a flat glass mold with a center thickness of 2 mm and a diameter of 78 mm. The mold was placed in a polymerization oven and the temperature was gradually increased from 20° C. to 130° C. for 21 hours to carry out polymerization. After polymerization was completed, the mold was removed from the oven. The obtained plano lenses were subjected to a further annealing process at 130° C. for 2 hours. The obtained plano lens with a thickness of 2 mm was transparent and suitable as a transparent resin for optical materials. The UV-visible light spectrum of the obtained plano lenses was measured using a Spectrophotometer UV-1800 (manufactured by Shimadzu Corporation). The evaluation results are shown in Table-1.

Example a4

Plano lenses with a thickness of 2 mm were obtained by the same method as in Example a3 except that 1.5 parts by weight of 3-[3-tert-butyl-5-(5-chloro-2H-benzotriazol-2-yl)-4-hydroxyphenyl]methylpropionate (Eversorb 88 manufactured by Everlight Chemical Industrial Corp.) was changed to 2.0 parts by weight. The obtained plano lens was transparent and suitable as a transparent resin for optical materials. The UV-visible light spectrum of the obtained plano lenses was measured using a Spectrophotometer UV-1800 (manufactured by Shimadzu Corporation). The evaluation results are shown in Table-1.

Comparative Example a1

Plano lenses with a thickness of 2 mm were obtained by the same method as in Example a1, except that 1.5 parts by weight of 3-[3-tert-butyl-5-(5-chloro-2H-benzotriazol-2-yl)-4-hydroxyphenyl]methylpropionate (Eversorb 88 manufactured by Everlight Chemical Industrial Corp.) were changed to 0.5 parts by weight of 2-(2-hydroxy-3-t-butyl-5-methylphenyl)-chlorobenzotriazole (TINUVIN 326 manufactured by BASF Corp.). The obtained plano lens was transparent and suitable as a transparent resin for optical materials. The UV-visible light spectrum of the obtained plano lenses was measured using a Spectrophotometer UV-1800 (manufactured by Shimadzu Corporation). The evaluation results are shown in Table-1.

Comparative Example a2

Plano lenses with a thickness of 2 mm were obtained by the same method as in Comparative Example a1 except that 0.5 parts by weight of 2-(2-hydroxy-3-t-butyl-5-methylphenyl)-chlorobenzotriazole (TINUVIN 326 manufactured by BASF Corp.) was changed to 0.7 parts by weight. The obtained plano lens was transparent and suitable as a transparent resin for optical materials. The UV-visible light spectrum of the obtained plano lenses was measured using a Spectrophotometer UV-1800 (manufactured by Shimadzu Corporation). The evaluation results are shown in Table-1.

TABLE 1

| | | | Example a1 | Example a2 | Example a3 | Example a4 | Comparative Example a1 | Comparative Example a2 |
|---|---|---|---|---|---|---|---|---|
| Composition | Isocyanate compound | a-1 | 52.0 | 52.0 | 50.6 | 50.6 | 52.0 | 52.0 |
| | Active hydrogen compound | b-1 | 48.0 | 48.0 | | | 48.0 | 48.0 |
| | | b-2 | | | 49.4 | 49.4 | | |
| | Ultraviolet absorber | c-1 | 1.5 | 2.0 | 1.5 | 2.0 | | |
| | | c-2 | | | | | 0.5 | 0.7 |
| Solubility | Dissolution completion time (40° C.) | min | 15 | 30 | 15 | 30 | 5 | 5 |
| Evaluation | Light transmittance (%) | 410 nm | 0.0 | 0.0 | 0.0 | 0.0 | 0.2 | 0.0 |
| | Y.I. (thickness 9 mm) | | 19.8 | 21.5 | 20.0 | 22.1 | 20.4 | 22.9 |
| | Absorbance at wavelength 410 nm | | 3.31 | 3.77 | 3.60 | 4.10 | 2.71 | 3.47 |
| | Y.I./(Absorbance at wavelength 410 nm) | | 6.07 | 5.78 | 5.63 | 5.46 | 7.68 | 6.70 |
| | Transparency | | Transparent | Transparent | Transparent | Transparent | Transparent | Transparent |

The isocyanate compounds, active hydrogen compounds, and ultraviolet absorbers listed in Table-1 are as follows.

a-1: Xylylenediisocyanate b-1: 4-mercaptomethyl-1,8-dimercapto-3,6-dithiaoctane b-2: Mixture of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane c-1: 3-[3-tert-butyl-5-(5-chloro-2H-benzotriazol-2-yl)-4-hydroxyphenyl]methylpropionate c-2: 2-(2-hydroxy-3-t-butyl-5-methylphenyl)-chlorobenzotriazole From the results shown in Table-1, the lens of Example a had an excellent effect of blocking blue light of approximately 420 nm from ultraviolet light, and in addition, the lens was transparent and the coloring was suppressed such that the design properties were excellent.

It is possible to compare the effect of Example a with Comparative Example a as follows.

The absorbance at a wavelength of 410 nm is an index of the effect of the ultraviolet absorber, and the larger the value, the greater the effect of blocking blue light, which is preferable. On the other hand, the coloring of the lens due to the addition of the ultraviolet absorber is shown by the Y.I., and the smaller the value, the smaller the coloring of the lens, which is preferable.

In Example a, the balance between the degree of lens coloring and the effect of blocking blue light due to the addition of a predetermined ultraviolet absorber is confirmed by calculating "Y.I./absorbance at 410 nm wavelength," and it is possible to express that the smaller this value is, the better the above balance.

The results of the "Y.I./absorbance at 410 nm wavelength" listed in Table-1 are shown in FIG. 1. As shown in FIG. 1, it was confirmed that the lens of Example a has a significantly superior balance between the degree of coloring and the effect of blocking blue light, compared to that of Comparative Example a.

Example b

The evaluation method in Example b is as follows.

<Evaluation Method>

Light Transmittance

The UV-visible light spectrum was measured using a Shimadzu Spectrophotometer UV-1800 manufactured by Shimadzu Corporation as the measurement instrument using a plano lens with a thickness of 2 mm and the transmittance at specific wavelengths (410 nm, 420 nm, 430 nm, and 800 nm) was measured.

Y.I. (Yellow Index)

A circular flat plastic lens with a thickness of 9 mm and Φ75 mm was created and the chromaticity coordinates x and y were measured using a CM-5 color spectrophotometer manufactured by MINOLTA Co., Ltd. in accordance with ASTM E313-73. Based on the x and y values of the measured results, the Y.I. was calculated using Formula (1).

$$Y.I. = (234*x + 106*y + 106)/y \quad (1)$$

Absorbance

In the light transmittance measurement, in a case where the transmittance at 420 nm, 410 nm, and 800 nm was set as T % [410 nm], T % [420 nm], and T % [800 nm], the calculation was carried out using the formula below.

$$\text{Absorbance at 410 nm} = -\left[\log(T\%[410\text{ nm}]/100) - \log(T\%[800\text{ nm}]/100)\right]$$

$$\text{Absorbance at 420 nm} = -\left[\log(T\%[420\text{ nm}]/100) - \log(T\%[800\text{ nm}]/100)\right]$$

For resins with no anti-reflection function, the transmittance decreases by approximately 10% due to reflection or the like even at the wavelength of 800 nm where there is no absorption. In order to exclude the influence of reflection and the like, the absorbance at 800 nm was subtracted from the absorbance calculated from the transmittance at a wavelength of 410 nm or a wavelength of 420 nm to obtain the absorbance.

Maximum Absorption Peak of Ultraviolet Absorber

The maximum absorption peaks of the ultraviolet absorbers used in Example b were as follows.

Measurement method: UV-visible light spectra were measured using a Shimadzu Spectrophotometer UV-1800 manufactured by Shimadzu Corporation as the measurement instrument, using a plano lens with a thickness of 2 mm.

Eversorb 88: A maximum absorption peak was present in a range of 340 nm to 370 nm.

Eversorb 109: A maximum absorption peak was present in a range of 340 nm to 370 nm.

Example b1

Figure 2:
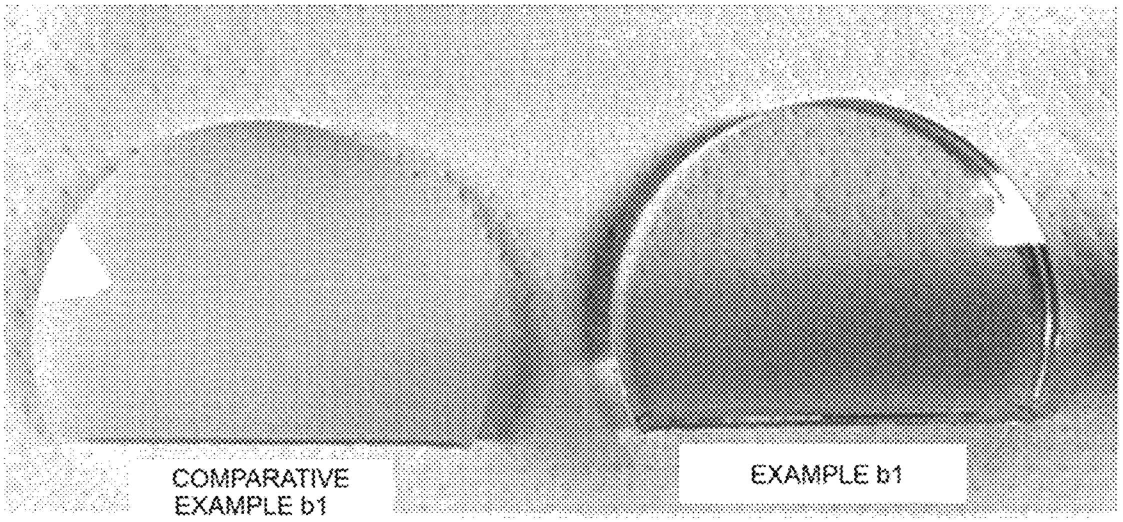
FIG. 2 is a photograph which shows external appearances of lenses obtained in Example b1 and Comparative Example b1.

1.2 parts by weight of 3-[3-tert-butyl-5-(5-chloro-2H-benzotriazol-2-yl)-4-hydroxyphenyl]methylpropionate (Eversorb 88, manufactured by Everlight Chemical Industrial Corp.) and 90.9 parts by weight of bis(2,3-epithiopropyl)disulfide were stirred and mixed at 30° C. to obtain a uniform solution. To this uniform solution, 9.1 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 0.09 parts by weight of N,N-dicyclohexylmethylamine, and 0.02 parts by weight of N,N-dimethylcyclohexylamine were added, and the result was stirred and mixed at 20° C. to obtain a mixed solution. The mixed solution was defoamed at 600 Pa for 1 hour, filtered through a 1 μm PTFE filter, and then injected into a mold formed of a 2C (curve, same below) plano glass mold with a center thickness of 2 mm and a diameter of 80 mm and a flat glass mold with a center thickness of 9 mm and a diameter of 78 mm. The mold was placed in a polymerization oven and the temperature was gradually increased from 30° C. to 120° C. for 21 hours to carry out polymerization. After polymerization was completed, the mold was removed from the oven. The obtained plano lenses were subjected to a further annealing process at 120° C. for 1 hour. As shown in FIG. 2, the obtained lens was transparent and suitable as a transparent resin for optical materials. The UV-visible light spectrum of the obtained plano lenses was measured using a Spectrophotometer UV-1800 (manufactured by Shimadzu Corporation). The evaluation results are shown in Table-2.

Example b2

0.6 parts by weight of 3-[3-tert-butyl-5-(5-chloro-2H-benzotriazol-2-yl)-4-hydroxyphenyl]methylpropionate (Eversorb 88, manufactured by Everlight Chemical Industrial Corp.) and 90.9 parts by weight of bis(2,3-epithiopropyl) disulfide were stirred and mixed at 30° C. to obtain a uniform solution. To this uniform solution, 9.1 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 0.09 parts by weight of N,N-dicyclohexylmethylamine, and 0.02 parts by weight of N,N-dimethylcyclohexylamine were added, and the result was stirred and mixed at 20° C. to obtain a mixed solution. The mixed solution was defoamed at 600 Pa for 1 hour, filtered through a 1 μm PTFE filter, and then injected into a mold formed of a 2C (curve, same below) plano glass mold with a center thickness of 2 mm and a diameter of 80 mm and a flat glass mold with a center thickness of 9 mm and a diameter of 78 mm. The mold was placed in a polymerization oven and the temperature was gradually increased from 30° C. to 120° C. for 21 hours to carry out polymerization. After polymerization was completed, the mold was removed from the oven. The obtained plano lenses were subjected to a further annealing process at 120° C. for 1 hour. The obtained lens was transparent as shown in FIG. 2 and suitable as a transparent resin for optical materials. The UV-visible light spectrum of the obtained plano lenses was measured using a Spectrophotometer UV-1800 (manufactured by Shimadzu Corporation). The evaluation results are shown in Table-2.

Example b3

0.9 parts by weight of 3-[3-tert-butyl-5-(5-chloro-2H-benzotriazol-2-yl)-4-hydroxyphenyl]methylpropionate (Eversorb 88, manufactured by Everlight Chemical Industrial Corp.) and 90.9 parts by weight of bis(2,3-epithiopropyl) disulfide were stirred and mixed at 30° C. to obtain a uniform solution. To this uniform solution, 9.1 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 0.09 parts by weight of N,N-dicyclohexylmethylamine, and 0.02 parts by weight of N,N-dimethylcyclohexylamine were added, and the result was stirred and mixed at 20° C. to obtain a mixed solution. The mixed solution was defoamed at 600 Pa for 1 hour, filtered through a 1 μm PTFE filter, and then injected into a mold formed of a 2C (curve, same below) plano glass mold with a center thickness of 2 mm and a diameter of 80 mm and a flat glass mold with a center thickness of 9 mm and a diameter of 78 mm. The mold was placed in a polymerization oven and the temperature was gradually increased from 30° C. to 120° C. for 21 hours to carry out polymerization. After polymerization was completed, the mold was removed from the oven. The obtained plano lenses were subjected to a further annealing process at 120° C. for 1 hour. The obtained lens was transparent as shown in FIG. 1 and suitable as a transparent resin for optical materials. The UV-visible light spectrum of the obtained plano lenses was measured using a Spectrophotometer UV-1800 (manufactured by Shimadzu Corporation). The evaluation results are shown in Table-2.

Comparative Example b1

A plano lens with a thickness of 2 mm and a flat plate with a thickness of 9 mm were obtained by the same method as in Example b1, except that 3-[3-tert-butyl-5-(5-chloro-2H-benzotriazol-2-yl)-4-hydroxyphenyl] methylpropionate (Eversorb 88 manufactured by Everlight Chemical Industrial Corp.) was changed to 3-[3-tert-butyl-5-(5-chloro-2H-benzotriazol-2-yl)-4-hydroxyphenyl] octyl propionate (Eversorb 109 manufactured by Everlight Chemical Industrial Corp.). Since the obtained lenses were opaque as shown in FIG. 2, the light transmittance, YI, and absorbance were not measured. The evaluation results are shown in Table-2.

TABLE 2

| | | Example b1 | Example b2 | Example b3 | Comparative Example b1 |
|---|---|---|---|---|---|
| Compound having cyclic structure including sulfur atom | d-1 | 90.9 | 90.9 | 90.9 | 90.9 |
| Polythiol compound | b-1 | 9.1 | 9.1 | 9.1 | 9.1 |
| Ultraviolet absorber | c-1 | 1.2 | 0.6 | 0.9 | — |
| | c-2 | — | — | — | 1.2 |

TABLE 2-continued

| | | Example b1 | Example b2 | Example b3 | Comparative Example b1 |
|---|---|---|---|---|---|
| Transmittance 2.0 mm thickness | 410 nm | 0.01 | 0.40 | 0.05 | Not measured as opaque |
| | 420 nm | 11.84 | 28.91 | 18.36 | |
| | 430 nm | 59.69 | 69.26 | 64.20 | |
| | 800 nm | 86.6 | 86.9 | 86.8 | |
| 9.0 mm thickness Conditions: YI E313-73 | YI | 24.36 | 20.3 | 22.5 | Not measured as opaque |
| 420 nm absorbance | | 0.86 | 0.48 | 0.67 | |
| Y.I./420 nm absorbance | | 28.18 | 42.39 | 33.36 | |
| 410 nm absorbance | | 3.90 | 2.34 | 3.25 | |
| Y.I./410 nm absorbance | | 6.25 | 8.67 | 6.93 | |
| Transparency | | Transparent | Transparent | Transparent | Opaque |

The compounds having a cyclic structure including sulfur atoms, polythiol compounds, and ultraviolet absorbers listed in Table-2 are as follows.

d-1: bis(2,3-epithiopropyl) disulfide b-1: mixture of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane c-1: 3-[3-tert-butyl-5-(5-chloro-2H-benzotriazol-2-yl)-4-hydroxyphenyl]methylpropionate c-2: 3-[3-tert-butyl-5-(5-chloro-2H-benzotriazol-2-yl)-4-hydroxyphenyl] octyl propionate From the results shown in Table-2, the lens of Example b had an excellent effect of blocking blue light of approximately 420 nm from ultraviolet light, and in addition, the lens was transparent and coloring was suppressed such that the design properties were excellent.

This application claims priority based on Japanese Patent Application No. 2019-021646 filed on Feb. 8, 2019 and Japanese Patent Application No. 2019-052771 filed on Mar. 20, 2019, the entire disclosure of which is hereby incorporated herein.

The invention claimed is:

1. A polymerizable composition for an optical material, the composition comprising:

(A) an isocyanate compound;

(B) at least one active hydrogen compound selected from a polythiol compound having two or more mercapto groups; and (C) an ultraviolet absorber represented by General Formula (2), (2)

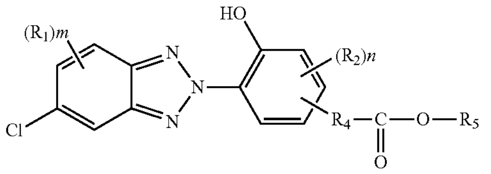

wherein, in General Formula (2), $R_1$ and $R_2$ represent an alkyl group having 1 to 8 carbon atoms, and may be the same or different, a plurality of $R_1$'s or a plurality of $R_2$'s may be the same or different, m represents an integer of 0 to 3, n represents an integer of 0 to 3, $R_4$ represents a hydrocarbon group having 1 to 3 carbon atoms, and $R_5$ represents a hydrocarbon group having 1 to 3 carbon atoms;

wherein the ultraviolet absorber (C) is 3-[3-tert-butyl-5-(5-chloro-2H-benzotriazol-2-yl)-4-hydroxyphenyl] methylpropionate;

wherein a content of the active hydrogen compound (B) in the polymerizable composition for an optical material is 30 parts by mass or more and 70 parts by mass or less in 100 parts by mass of the polymerizable composition for an optical material;

wherein the ultraviolet absorber (C) is included in an amount of 1.5 to 2.0 parts by mass in 100 parts by mass of the polymerizable composition for an optical material.

2. The polymerizable composition for an optical material according to claim 1, wherein a maximum absorption peak of the ultraviolet absorber (C) is in a range of 340 nm to 370 nm.

3. The polymerizable composition for an optical material according to claim 1, wherein the isocyanate compound (A) includes at least one selected from an aromatic isocyanate compound and an aromatic aliphatic isocyanate compound.

4. The polymerizable composition for an optical material according to claim 3, wherein the isocyanate compound (A) is at least one selected from the group consisting of xylene diisocyanate, phenylene diisocyanate, tolylene diisocyanate, and diphenylmethane diisocyanate.

5. The polymerizable composition for an optical material according to claim 1, wherein the polythiol compound (B) is at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis (mercaptomethylthio)propane, 4,6-bis (mercaptomethylthio)-1,3-dithiane, 2-(2,2-bis (mercaptomethylthio)ethyl)-1,3-dithiethane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate).

6. A cured product of the polymerizable composition for an optical material according to claim 1.

7. A plastic lens comprising:

the cured product according to claim 6.

* * * * *